United States Patent [19]

Raidel

[11] 4,114,923
[45] Sep. 19, 1978

[54] AIR SPRING AND BEAM SUSPENSION

[76] Inventor: John E. Raidel, Rte. 9, Box 400-M, Springfield, Mo. 65804

[21] Appl. No.: 728,867

[22] Filed: Oct. 1, 1976

[51] Int. Cl.² ............................................. B60G 11/26
[52] U.S. Cl. ................................................. 280/711
[58] Field of Search ............... 280/711, 702, 705, 709, 280/712, 713

[56] References Cited

U.S. PATENT DOCUMENTS

| 2,290,620 | 7/1942 | Brown | 280/711 |
| 2,903,256 | 9/1959 | Weiss | 280/711 X |
| 2,970,848 | 2/1961 | Rice | 280/711 |

*Primary Examiner*—Joseph F. Peters, Jr.
*Assistant Examiner*—R. Schrecengost
*Attorney, Agent, or Firm*—Rogers, Eilers & Howell

[57] ABSTRACT

This suspension assembly is for a vehicle with a chassis and at least one axle. A front and a rear air spring depend downwardly from the chassis on either side of the axle. A beam extends between the free floating ends of the air springs and provides the mounting location for an axle seat assembly. The axle seat assembly rigidly secures the axle to the beam. A hanger assembly extends downwardly from the chassis and provides the forward mounting location for a radius rod which pivotally connects between the beam and the hanger. A radius rod extends between the axle and the chassis so as to form a parallelogram with the other radius rod.

9 Claims, 5 Drawing Figures

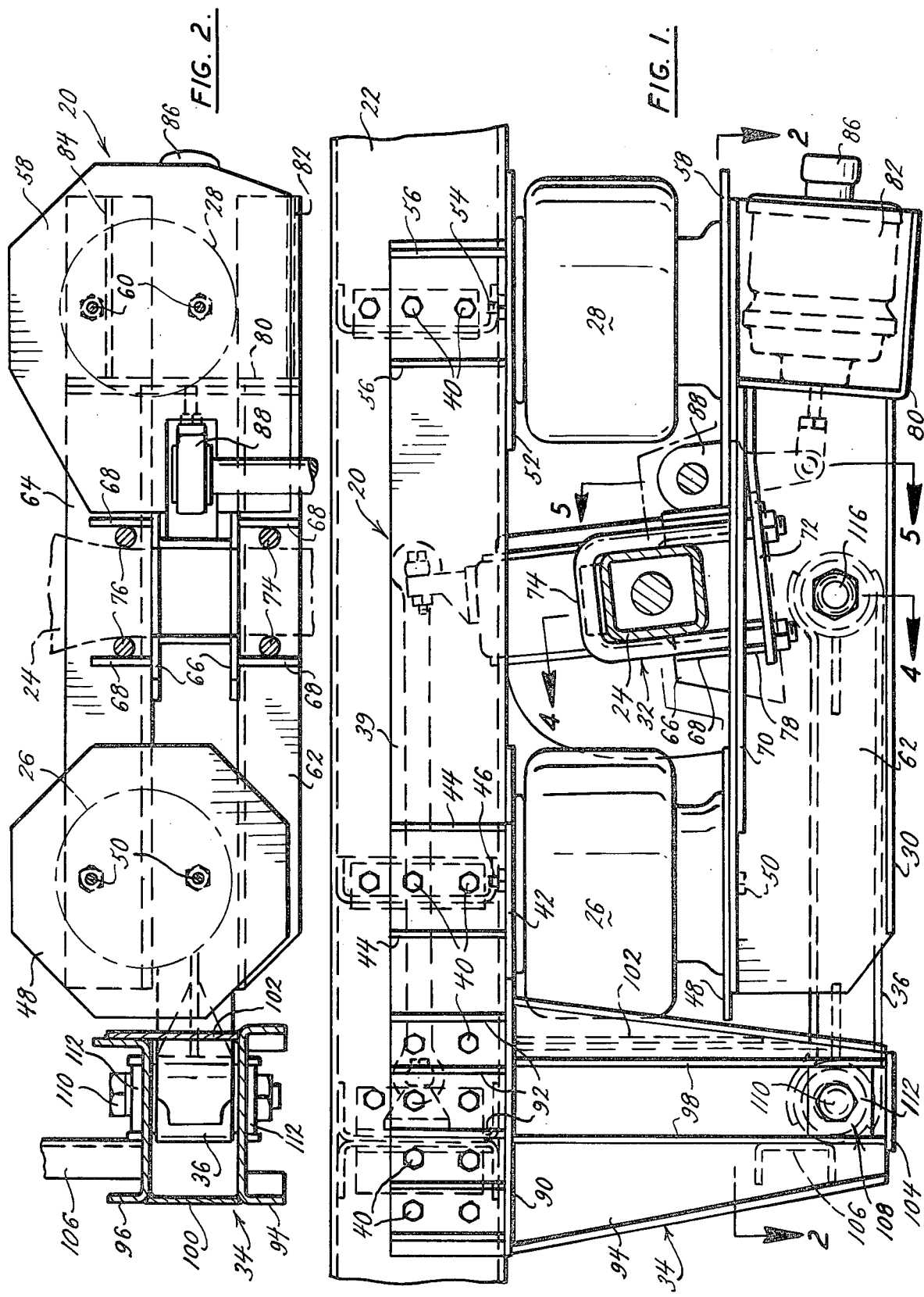

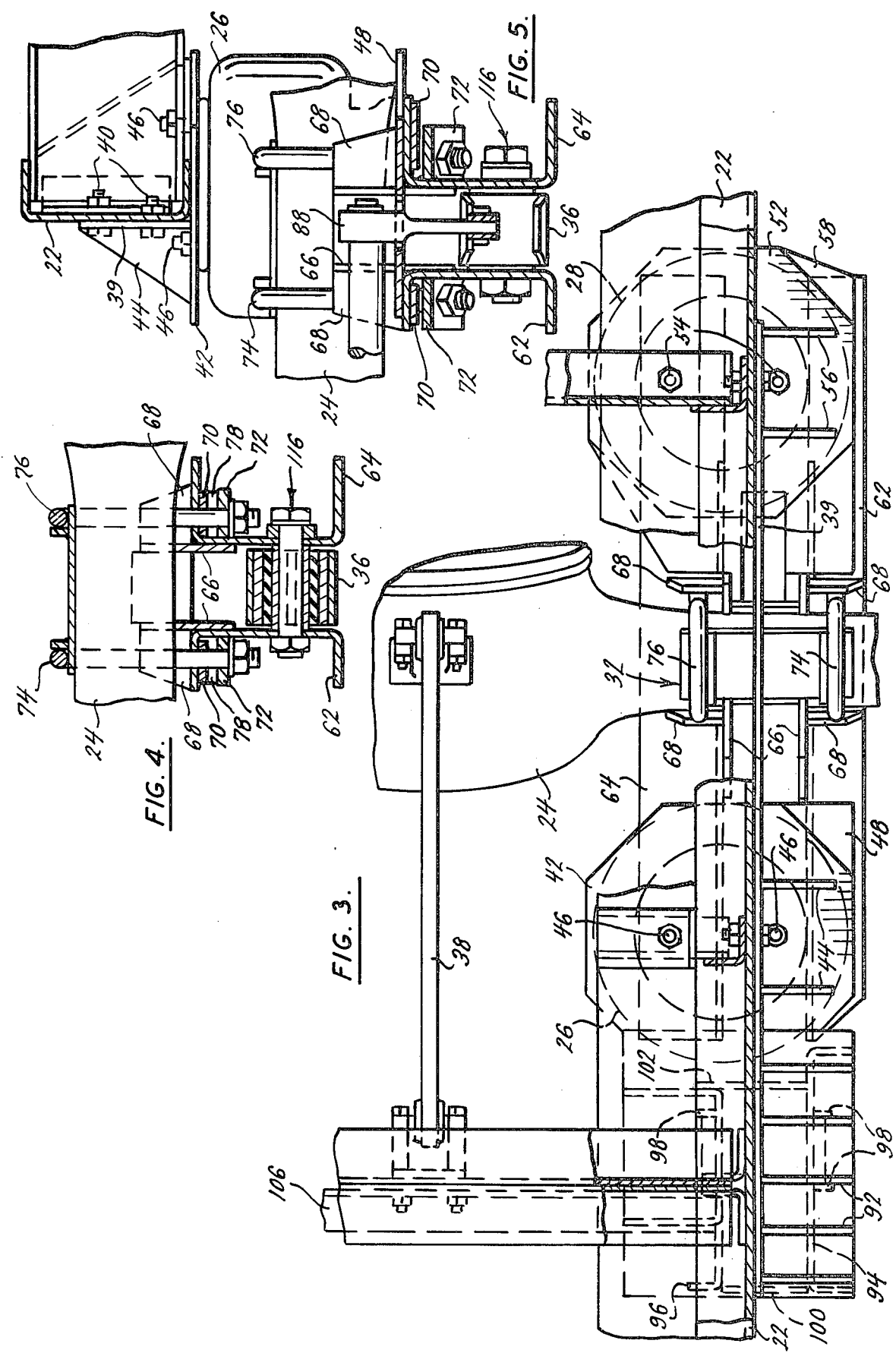

AIR SPRING AND BEAM SUSPENSION

SUMMARY OF THE INVENTION

This invention generally relates to a suspension assembly for a vehicle, and more specifically one of an air spring type wherein the axle is completely resiliently supported by air springs which combine with a parallelogram arrangement for maintaining the axle pitch constant during up and down movement of the axle. The structure of this invention is still more specifically one which locates the air springs on opposite sides of the axle and on the same side of the hanger assembly.

Generally, the suspension of this invention includes a hanger depending from the vehicle chassis to which one end of a radius rod is pivotally mounted, the rod extending rearwardly therefrom. The rearward end of the rod is pivotally mounted to a beam to which the vehicle axle is secured. Air springs are mounted between the beam and the chassis fore and aft of the axle and rearwardly of the hanger assembly to provide the resilient support of the chassis on the axle. Another radius rod is pivotally mounted between the chassis and the axle, such as at a central location of the axle, and is generally parallel and equal in length to the first rod to define a parallelogram arrangement whereby upward and downward movement of the axle produces upward and downward movement of the beam and axle to maintain their pitch constant during articulation of the axle.

Thus, it is a primary object of this invention to provide a totally air spring ride in a suspension assembly in combination with a parallelogram arrangement for maintaining the axle pitch constant as the axle is loaded and unloaded. This and other objects are apparent from the drawing and detailed description to follow.

DESCRIPTION OF THE DRAWINGS

FIG. 1 is a side elevation view of a suspension assembly of this invention;

FIG. 2 is a view in section taken along the line 2—2 of FIG. 1;

FIG. 3 is a top plan view of FIG. 1;

FIG. 4 is a section view detailing the axle mount assembly taken along the line 4—4 of FIG. 1; and FIG. 5 further details the axle mount assembly and is taken along the line 5—5 of FIG. 1.

DETAILED DESCRIPTION OF A PREFERRED EMBODIMENT

This suspension assembly 20 is designed for installation between the chassis 22 of a vehicle and one of its axles 24. Although only a suspension assembly 20 for one side of the vehicle is shown, an identical suspension assembly 20 would be installed on the opposite side of the vehicle. Additional suspension assemblies 20 could be used for vehicles with multiple axles 24.

The suspension assembly 20 consists essentially of a front air spring 26 and a rear spring 28 depending from the chassis 22. A beam 30 is mounted between the floating ends of the air springs 26 and 28, and an axle seat assembly 32 rigidly attaches to the axle 24 and secures it to the beam 30. A hanger assembly 34 extends downwardly from the chassis 22 and provides the mounting location for the forward end of a radius or torque rod 36 which is pivotally connected between the hanger 34 and the beam 30. A radius rod 38 is pivotally connected between the axle 24 and the chassis 22 and forms an approximate parallelogram with the rod 36 to stabilize the axle 24.

The foregoing general components of the suspension assembly 20 will now be described in greater detail.

Referring to FIGS. 1 and 2, the suspension system 20 is secured to the chassis 22 by a gusset plate 39 and a plurality of bolts 40. A top plate 42 for the front air spring 26 is secured to the gusset plate 39 and has reinforcing webs 44. Bolts 46 attach the front air spring 26 to the top plate 42. Similarly, a bottom plate 48 is attached to the front air spring 26 by bolts 50. The rear air spring 28 is secured to a top plate 52 by bolts 54 with reinforcing webs 56 extending between the gusset plate 38 and the top plate 52. A bottom plate 58 is secured to the rear air spring 28 by bolts 60.

Two U-channels 62 and 64 extend between the bottom plates 48 and 58 of the air springs 26 and 28 forming the beam 30 to which the axle seat assembly 32 is secured. The axle seat assembly 32 consists of an axle seat bracket 66 which has a plurality of ears 68 to fit the contours of the axle 24 and the U-channels 62 and 64. Reinforcing brackets 70 and 72 are welded to the U-channels 62 and 64 to strengthen the assembly and provide a surface for clamping the axle 24 to the axle seat assembly 32 and beam 30 with U-bolts 74 and 76. A spacer 78 fits between brackets 70 and 72 to allow a tight clamp with a minimum of stress between the brackets 70 and 72. An L-plate 80 attaches to the rear end of the U-channels 62 and 64 below the rear air spring 28 with side plates 82 and 84 enclosing its sides. This provides a convenient location to mount an air brake cylinder 86 and cam operating mechanism 88.

The hanger assembly 34 has a horizontal plate 90 and reinforcing webs 92 securing it to the gusset plate 39. Inboard and outboard U-channels 94 and 96, respectively, form the body of the hanger 34 with vertical side brackets 98 strengthening the assembly. End plates 100 and 102 and bottom plate 104 enclose the space between the U-channels 94 and 96. A U-bracket 106 is welded to vertical side bracket 98 and extends the width of the vehicle to the opposite suspension assembly (not shown).

An eccentric bushing assembly 108 is mounted in the hanger assembly 34 with bolt 110 and antitorque washers 112. Bushing assembly 108 has a cam or eccentric bolt for axle alignment and adjustment of axle pitch and may be of the type shown as item 68 in U.S. Pat. No. 3,801,086, incorporated herein by reference. The rod 36 is secured to the hanger assembly 34 by this eccentric bushing 108 and extends rearward to just below the axle 24. A bushing assembly 116 extending between the U-channels 94 and 96 secures a rear end of the rod 36 to the beam 30. Bushing assembly 116 may be of the type shown as item 108 in U.S. Pat. No. 3,801,086.

The rod 38 is pivotally connected between the axle 24 and the chassis 22, such as at the center of the axle as shown, and is the other longitudinal elememt of the parallelogram for stabilizing the axle 24. A double action shock absorber (not shown) can extend from any convenient location on the beam 30 to the chassis 22 depending upon the physical obstruction of surrounding structures. The double action shock absorber dampens the oscillations of the axle 24 as supported by the air springs 26 and 28.

OPERATION

The operation of the suspension assembly of this invention is evident from the foregoing description. As load is applied to the axle 24, the air springs 26 and 28, located on opposite sides of the axle and to the rear of the hanger assembly 34, compress from upward movement of the beam 30. As the axle moves upwardly under load, the forward and rearward ends of the rod 36 and rod 38 pivot in a counterclockwise direction about their axes, and since these rods are of approximately the same length, the pitch of the axle 24 remains constant during loading and unloading of the axle.

Thus, there has been described a completely air spring suspension where the springs are mounted on the same side of the hanger assembly and on opposite sides of the axle and including a parallelogram arrangement for maintaining the axle pitch constant as the axle is loaded and unloaded, thus combining the comfort of an air spring ride and the stability of a parallelogram arrangement.

Various changes and modifications may be made in this invention, as will be readily apparent to those skilled in the art. Such changes and modifications are within the scope and teaching of this invention as defined by the claims appended hereto.

What is claimed is:

1. A suspension assembly for supporting a vehicle chassis on a vehicle axle comprising a hanger depending from the chassis and rigidly supported thereto to form a member thereof, a beam extending in the generally fore and aft direction located rearwardly of the hanger, means for rigidly mounting the vehicle axle to said beam to define an axle and beam assembly, said beam having spaced apart side walls defining a longitudinal recess extending in the generally fore and aft direction, spring means located rearwardly of said hanger and mounted between said beam and chassis for resiliently resisting movement of the axle and beam assembly during loading and unloading of the axle, and parallelogram means mounted between said chassis and said axle and beam assembly maintaining the pitch of the axle and beam assembly constant during loading and unloading of the axle, said parallelogram means further comprising at least one rod having its forward end pivotally mounted to said hanger and its rearward end pivotally mounted to said axle and beam assembly between said side walls, said rod being received within the longitudinal recess defined between the side walls of the beam to allow unobstructed pivotal movement of the rod upon loading and unloading of the axle, and said beam further having a compartment therein located rearwardly of the rearward pivotal mount of the rod for housing an air brake cylinder.

2. The suspension assembly of claim 1 wherein said spring means further comprises at least one air spring mounted forward of said axle and rearward of said hanger, and at least one air spring mounted rearward of said axle.

3. The suspension assembly of claim 1 wherein said parallelogram means further comprises at least two rods which are generally parallel and approximately the same length, the forward end of each of said rods being pivotally mounted to a chassis member with its rearward end pivotally mounted to said axle and beam assembly.

4. The suspension assembly of claim 3 wherein one of the rods has its forward end pivotally mounted to a chassis member and its rearward end pivotally mounted to said axle.

5. The suspension assembly of claim 2 wherein said parallelogram means further comprises at least two rods which are generally parallel and approximately equal in length, one such rod having its forward end pivotally mounted to said hanger and its rearward end pivotally mounted to said axle and beam assembly, and another of said rods having its forward end pivotally mounted to a chassis member and its rearward end pivotally mounted to said axle.

6. The suspension assembly of claim 1 wherein said pivotal mount for said rod comprises means for adjusting axle alignment.

7. The suspension assembly of claim 1 wherein said beam has a top surface to which said spring means are mounted, said air brake cylinder compartment being located just beneath said top surface.

8. The suspension assembly of claim 7 wherein said spring means further comprises at least one air spring mounted forward of said axle and rearward of said hanger above said rod, and at least one air spring mounted rearward of said axle above said air brake cylinder compartment.

9. The suspension assembly of claim 8 further comprising an opening in the top surface of said beam rearwardly of said rearward pivotal mount of said rod for reception therethrough of an operating mechanism for said air brake cylinder.

* * * * *